(12) United States Patent
McMahon

(10) Patent No.: US 12,072,055 B2
(45) Date of Patent: Aug. 27, 2024

(54) REPAIR OF RIGID PLASTIC PIPE

(71) Applicant: John McMahon, Sonoma, CA (US)

(72) Inventor: John McMahon, Sonoma, CA (US)

( * ) Notice: Subject to any disclaimer, the term of this patent is extended or adjusted under 35 U.S.C. 154(b) by 126 days.

(21) Appl. No.: 17/867,542

(22) Filed: Jul. 18, 2022

(65) Prior Publication Data

US 2024/0019069 A1   Jan. 18, 2024

(51) Int. Cl.
*F16L 55/16* (2006.01)
*B29C 65/48* (2006.01)
*F16L 55/18* (2006.01)

(52) U.S. Cl.
CPC ...... *F16L 55/1608* (2013.01); *B29C 65/4805* (2013.01); *F16L 55/18* (2013.01)

(58) Field of Classification Search
CPC .... F16L 55/1608; F16L 55/18; B29C 65/4805
USPC ........................................................ 138/97
See application file for complete search history.

(56) References Cited

U.S. PATENT DOCUMENTS

| | | | | |
|---|---|---|---|---|
| 556,106 A * | 3/1896 | Schiele | ................ | F16L 21/002 |
| | | | | 285/31 |
| 3,826,521 A * | 7/1974 | Wilhelmsen | ............ | F16L 47/02 |
| | | | | 285/31 |
| 3,971,574 A * | 7/1976 | Curtin | .................... | F16L 13/103 |
| | | | | 285/31 |
| 4,035,002 A | 7/1977 | Curtin | | |
| 4,521,037 A * | 6/1985 | Knox | ...................... | F16L 25/12 |
| | | | | 285/31 |
| 4,690,434 A | 9/1987 | Schmidt | | |
| 4,858,958 A * | 8/1989 | Harbeke | ............... | F16L 13/103 |
| | | | | 285/31 |
| 6,318,761 B1 | 11/2001 | Robertson | | |
| 9,334,988 B2 * | 5/2016 | Gallagher | ............. | F16L 19/005 |
| 10,100,964 B1 * | 10/2018 | Scott | ................... | F16L 55/1608 |
| 10,190,709 B2 * | 1/2019 | Delmar | .................... | F16L 21/06 |
| 2018/0017192 A1 * | 1/2018 | Baruh | ................... | F16L 13/103 |

* cited by examiner

*Primary Examiner* — David R Deal
(74) *Attorney, Agent, or Firm* — Thomas M. Freiburger

(57) ABSTRACT

A broken pipe, such as a PVC water pipe, is repaired by cutting out a section and replacing that section with a special repair assembly. The replacement section is of at least the same diameter and specification, such as ASTM Schedule 40 PVC, as the existing line of pipe. The ends of the repair pipe section and ends of the existing pipe are provided with increased diameters, and special one-way couplings are provided to slide over the two joints, one at each end of the repair section, to solvent weld the joints together. In a modified procedure a single joint is made with the special coupling.

21 Claims, 4 Drawing Sheets

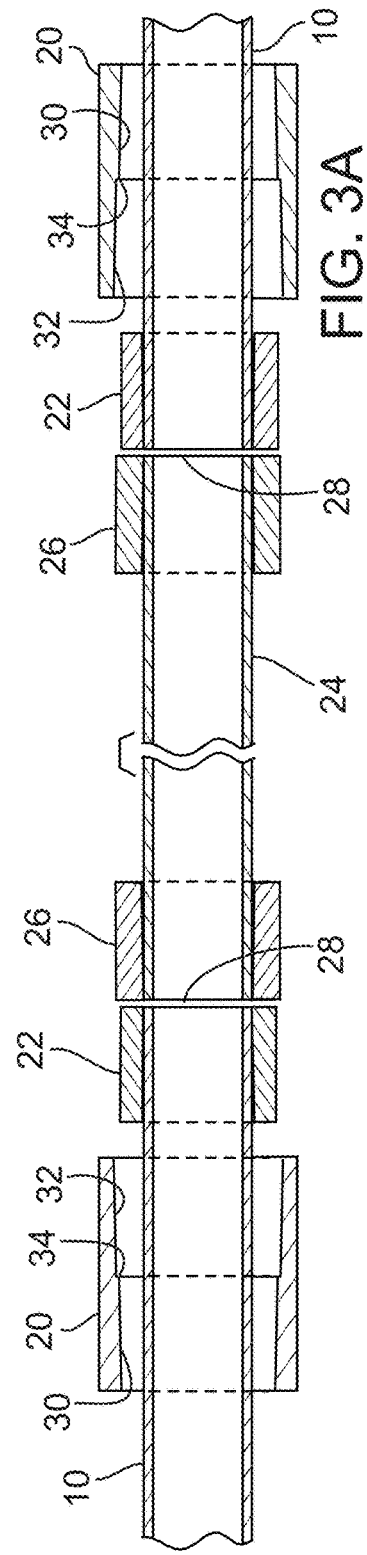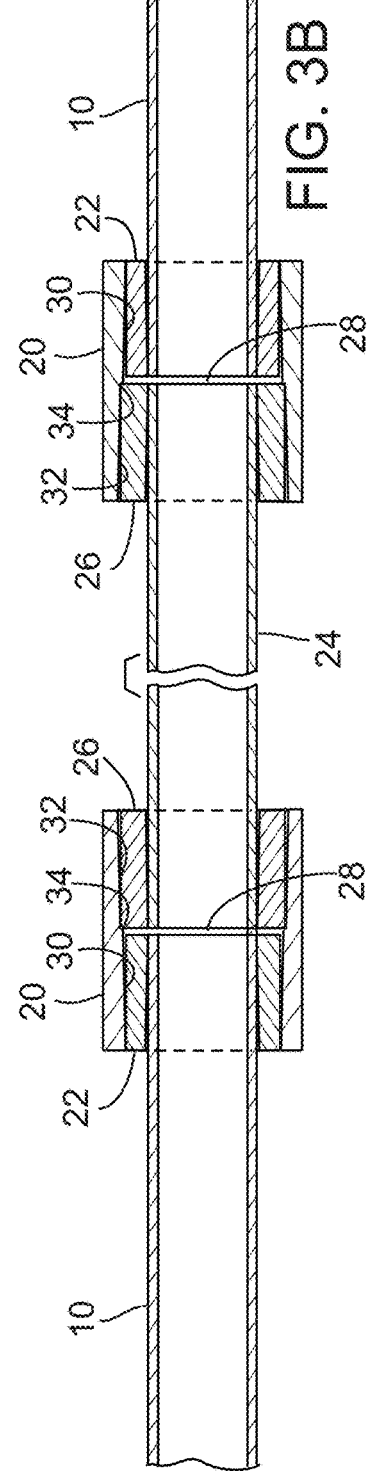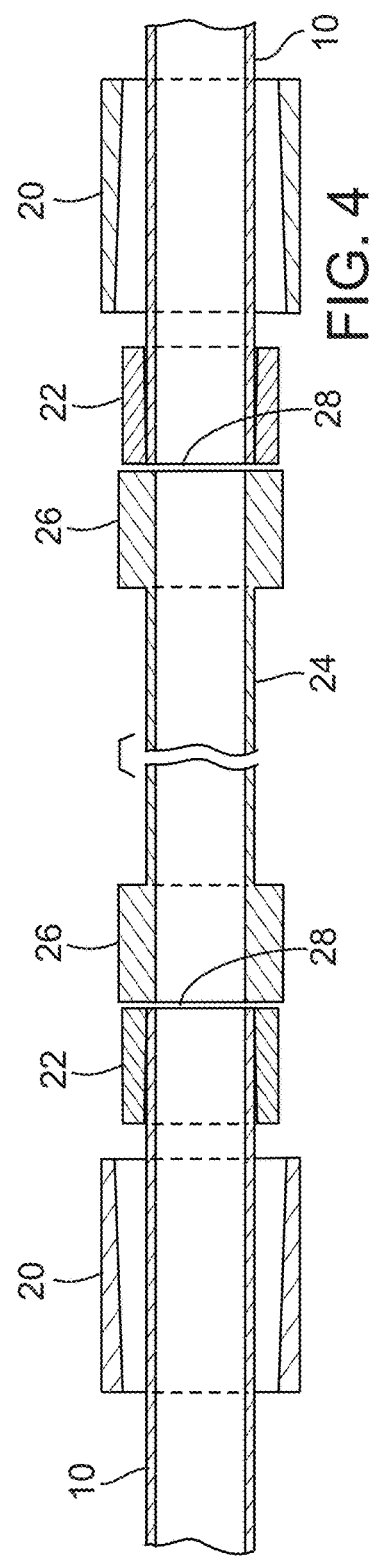

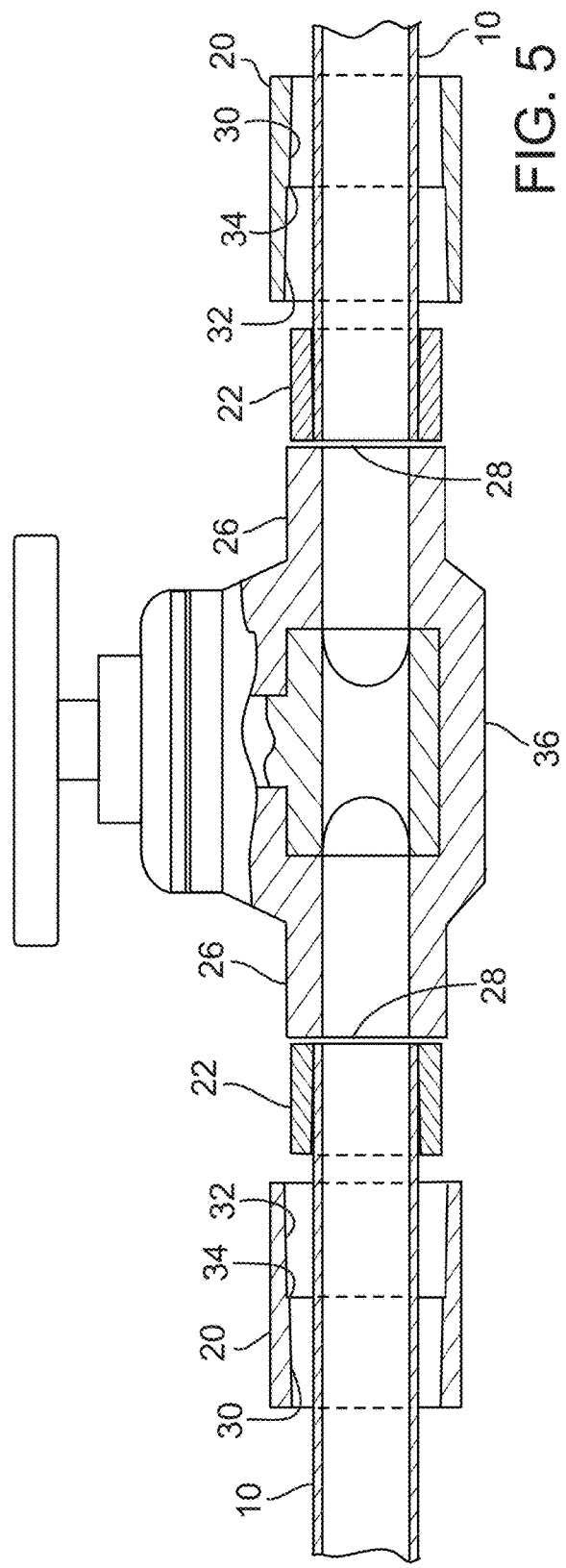
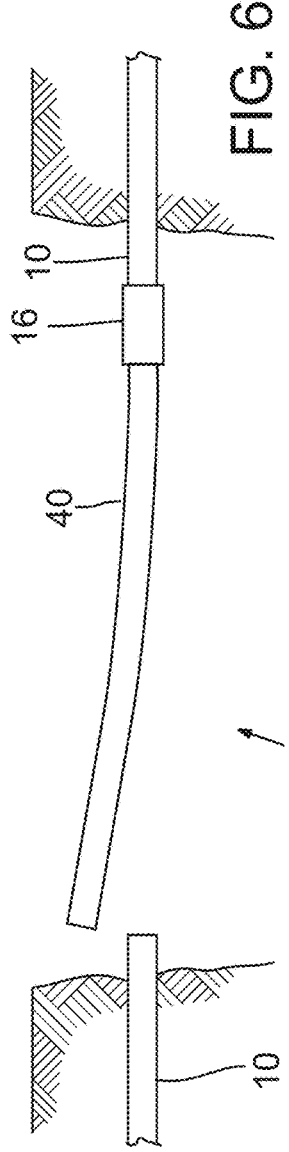
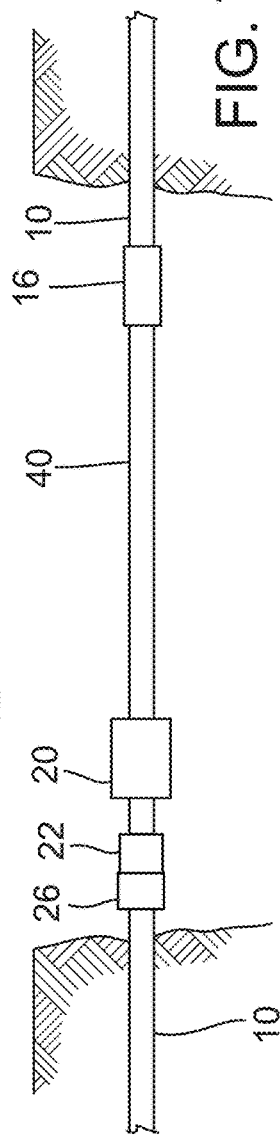

REPAIR OF RIGID PLASTIC PIPE

BACKGROUND OF THE INVENTION

This invention concerns repair of a section of installed plastic pipe, such as PVC pipe, or installation of a valve, Tee or branch into an installed line of pipe.

When an existing line of pipe, such as PVC or ABS pipe, which may be laid underground, is damaged and needs repair or when a valve or branch is to be installed in a line, a problem arises in that the PVC couplings require sliding onto ends of pipe for solvent weld joints to be made. Thus, if a section of pipe is removed, such as one foot or so of pipe length, the replacement should be of the same length, but will require two couplings, each of which requires a minimum distance of sliding motion to make the joints, about one inch for one-inch PVC pipe, thus requiring about double the distance of axial movement of the existing pipe, in order to open a gap and then close it to make the joints. This is not possible in close spaces or when the pipe is underground.

This issue has been addressed previously. See U.S. Pat. No. 6,318,761, which shows a replacement pipe fitting including a pair of outwardly slidable couplings each of which is designed to be secured to and adhered by solvent glue to an end of the replacement pipe and an adjacent end of the existing line of pipe. However, that solution required a smaller-diameter replacement pipe, with a smaller outside and inside diameter than the existing pipe. Typically this is objectionable, as it will throttle the flow of water or fluid through the pipe, creating a bottleneck. The patent seems also to show a slightly thinner wall in the replacement pipe fitting, which can also be objectionable as not meeting a standard code, such as when ASTM Schedule 80 PVC or Schedule 40 PVC pipe is required, along with similarly-rated fittings/couplings.

Another solution in the prior art was a special replacement fitting with a coupling at a first end and a slidable section of pipe at the opposite end, slidable within a barrel, sealed against leakage by O-rings that permitted the sliding. At the first end was a threaded collar, for screwing onto the end of the barrel, with another O-ring to seal the coupling against the threaded annular collar. To install such a replacement device the slidable pipe piece was pushed into the barrel to temporarily shorten the assembly, then the slidable pipe was coupled to an existing pipe end with a solvent adhesive, and the first end of the device with the built-in coupling was solvent welded to the other existing pipe end, the slidable pipe being slid back outwardly to re-expand the length to make these connections. A major problem with that solution was that O-rings have a limited life, and in fact many jurisdictions will not allow these repair devices with O-rings to be buried underground.

The invention described below provides a solution to the above problems, with a replacement pipe fitting assembly that retains the diameter and the required pipe specification and avoid use of O-rings.

SUMMARY OF THE INVENTION

The invention provides for fast and efficient repair or replacement of a section of existing pipe. A replacement pipe fitting assembly is installed in replacement of the same length of existing pipe being removed, to repair a break or to install, for example, a valve or a Tee or other branch or fitting. The assembly preferably includes a short replacement pipe of the same diameter and rating (e.g. ASTM Schedule 40 or Schedule 80 PVC) as the existing length of pipe. At each end of the replacement pipe is a bushing or simply an enlarged-diameter end or boss that is of prescribed axial socket length for solvent bonding of couplings to a particular type of plastic pipe.

On the two ends of existing pipe (after removal of a section), a sleeve bushing is attached to each of those pipe ends, adhered by the typical solvent adhesive. The two bushings have an internal taper as is typical with couplings for solvent weld plastic pipe. These are secured by solvent welding to the existing pipe ends. However, before these are attached, a special coupling is slid loosely over each of the existing pipe ends, so that these two couplings are available for sliding inwardly to later make the two replacement joints.

Importantly, the sleeve bushings installed on the two existing pipe ends are of smaller outside diameter than the bushings or bosses on the ends of the replacement pipe, thus forming a step of increased diameter from the pipe end to the adjacent replacement pipe boss.

To make the connection into the existing length of pipe, the replacement pipe is placed in position, aligned between the ends of the existing pipe and substantially in contact with those pipe ends, or with small gaps at each joint (large enough to accommodate a stop on an end of the bushing, if included). The solvent adhesive is applied to the interior of each of the special couplings, or to the exterior surfaces of the enlarged-diameter bushings or bosses on each existing pipe end and on an adjacent end of the replacement pipe, or both. The special couplings are then slid inwardly toward one another, to engage over both the applied sleeve bushings and the adjacent end bosses of the replacement pipe, such that the interior of each coupling engages tightly against and is solvent welded to both adjacent ends, of the existing pipe and of the replacement pipe, at each of the two joints.

This requires that the special couplings have a particular interior configuration. In a preferred embodiment the interior of the coupling is in two different serially positioned halves, one with a larger diameter to engage over the end of the existing pipe. Both parts have the required taper, as specified for the particular type of solvent-bonded pipe, with a step between the two tapered interior surfaces. The internal step provides a stop for the coupling, engaging against the stepped up diameter of the replacement pipe boss or bushing.

In a variation, the interior of the special coupling can have a consistent, uniform taper throughout its axial length. For this embodiment each sleeve bushing and the adjacent boss on the end of the replacement pipe can have a slight taper in the same direction as the coupling's internal taper, since the slide-on distance is doubled as compared to a simple coupling connection and a secure bond must be made between the coupling and both bushings/bosses.

With the invention a repair to a damaged underground or otherwise tightly positioned pipe, or addition of a valve or Tee fitting, is made simple, efficient and reliable. These and other objects, advantages and features of the invention will be apparent from the following description of a preferred embodiment, considered along with the accompanying drawings.

DESCRIPTION OF THE DRAWINGS

FIGS. 3A and 3B are views in cross section showing an installation made with the replacement pipe assembly of the invention.

FIG. 4 is a sectional view showing a variation of the assembly in FIG. 3.

FIG. 5 is a view similar to FIG. 3 but with a valve installed with the replacement pipe section.

FIG. 6 is a schematic view showing a pipe deflected to offset two pipe sections at the location of a joint to be made.

FIG. 7 is a simple schematic showing a joint being made according to the invention, in the pipe of FIG. 6.

DESCRIPTION OF PREFERRED EMBODIMENTS

Figure 1:
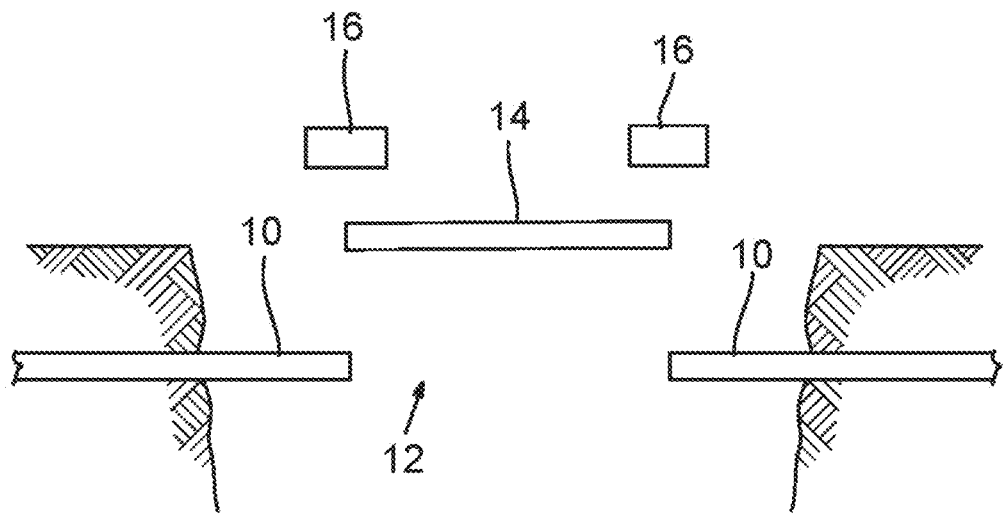
FIG. 1 is a view showing prior art to illustrate the problem of replacing a section of rigid plastic pipe.

FIG. 1 illustrates a prior art plastic pipe installation showing the problem to be addressed with the invention. An existing pipe 10 has a gap 12 where the pipe has been cut out, as to repair a break or to install a valve or Tee. However, a short replacement pipe, such as shown at 14, cannot be installed using a typical slip-on, solvent bonded couplings 16 as used for PVC, ABS, CPVC or other plastic pipe. The existing pipe 10 is underground or otherwise restricted to its position such that it cannot be moved axially to create the required space for sliding the existing pipe ends into the couplings 16, after those couplings have been attached to replacement section 14. The two pipe sections cannot be swung upwardly to create such a gap.

Figure 2:
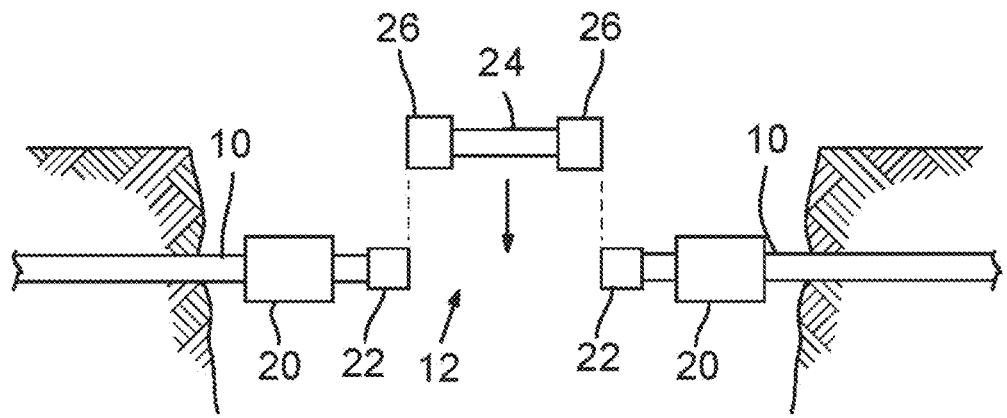
FIG. 2 is a schematic indication of the use of the replacement pipe assembly of the invention.

In FIG. 2 an existing pipe length 10 is again shown, but with the replacement system of the invention illustrated. The existing pipe 10 has been cut to leave a space 12.

The first step after removal of the pipe section is to slide two special one-way couplings 20 onto the pipe, one over each end of existing pipe as shown. These one-way couplings fit loosely over the pipe.

Next, a sleeve bushing 22 is secured to each existing pipe end. These are special bushings to be solvent welded at both inner and outer surfaces, with tapered interior meeting specifications required for couplings with a particular type of plastic pipe. They are secured over the existing pipe ends by solvent welding in the usual manner.

A replacement pipe 24 is provided, having approximately the same length as the space 12, or leaving small gaps. Importantly, the replacement pipe 24 is of the same diameter as the existing pipe 10, and usually will be at the same rating. The replacement pipe 24 has enlarged ends 26, for engagement with the special couplings 20. These can be provided by integral molding, such as a PVC or ABS plastic, or they can be bushings attached by the usual solvent bonding onto a piece of pipe, their interiors being tapered. Note that the replacement pipe could have virtually zero length if desired for a tight space. It could simply be the two enlarged ends 26 back to back, i.e. a short section of larger pipe, provided it meets the ASTM standard for the line of pipe. However, it may be preferable even in that case to have an internal diameter equal to that of the existing pipe for purposes of liquid flow through the pipe. As a set of components to be sold for making a repair or adding a valve or branch in the pipe, the components can include the two bushings 26, the two bushings 22, and the two couplings 20. Alternatively, the replacement pipe 24 can be included in the components, having enlarged ends already in place, whether integrally molded or not. Optionally, as noted above, for a tight space a short section of pipe with O.D. as in the bosses 26 can be included in lieu of (or in addition to) the pipe 24. Alternatively, the set of components can have only one large bushing 26, one small bushing 22 and one special coupling 20, for a single pipe joint, as discussed below.

When the connections are to be made, the replacement pipe 24 is positioned in the space 12, coaxially with the existing length of pipe 10, the solvent adhesive is applied externally to the bushings 22 and 26, or internally to the couplings 20, or both, and the couplings 20 are slid inwardly to engage the tapered interior of each coupling with both the bushing 22 and the enlarged end or bushing 26. This provides a strong and permanently sealed joint, with pipe of at least the same diameter (and preferably) rating as the existing pipe.

FIGS. 3A and 3B are cross sectional views showing the installation of FIG. 2 just before and after completion, and revealing a preferred structure of the bushings, bosses and couplings. Some of the dimensions are not to scale. Both couplings 20 are slid inwardly toward one another, and in FIG. 3B the two solvent welds of each coupling 20 have been made, essentially simultaneously. The replacement pipe section 24 is shown with the bosses or bushings 26 (either integrally formed as in FIG. 4 or solvent bonded onto the pipe). The replacement pipe 24 with its enlarged ends or bosses 26 abuts closely in the space between the existing lengths of pipe 10. Abutting pipe joints are shown at 28. As shown, and as discussed above, the bosses 26 are slightly larger in outer diameter than the bushings 22 affixed to the end of the pipe 10. The difference in diameter may be, for one-inch PVC pipe as an example, about 5 to 6 mm, i.e. about 0.2" to 0.24" in a preferred embodiment. This and other dimensions will vary with nominal pipe size. The couplings are shown in the drawing with exaggerated interior tapers for clarity. As discussed above, the tapers are in two stages, which can be called inner and outer (smaller and larger) tapers 30 and 32. For PVC pipe of one inch diameter (I.D.), for example, per ASTM standards the taper defines a difference in entrance diameter and bottom or depth diameter of 0.15", with a minimum socket axial length of 0.875" for Schedule 40 PVC and 1.125" for Schedule 80 PVC (these specifications may change over time). This defines a small taper angle. The two abutting bosses/bushings 26, 20 form a step 34 at the abutting joint, and the interior of the coupling 20 is preferably stepped at the same location, so that two separate tapered internal surfaces are provided of different diameters, one for the bushing 22 on the existing pipe and one for the boss 26 on the replacement pipe.

The taper angles and depth of the sockets will be industry standard for each pipe size. The socket may include a stop as explained below in reference to FIG. 8.

As noted above, the taper angles are exaggerated to demonstrate the principles of the invention in these drawings; in actual practice the taper angles are smaller (as described above) and the pipe and the coupling will deform very slightly when forced together, so that a much larger area of contact is provided, at both the locations 26 and 22. As an alternative to the coupling 20 having tapered cavities, the bushings or bosses 26 and 22 could be tapered at exterior, although the tapered coupling is preferred.

As an example, a special coupling of the invention, specific to one inch pipe, with appropriate wall thicknesses to meet ASTM standards for couplings, will be about 66 mm or so in length and about 57 mm or so in O.D. Thus, the length will be greater than the diameter.

FIG. 4 shows a variation in which the coupling 20 has an internal surface with a constant taper throughout the axial length. Here, the axial length through which the coupling 20 must slide again is double (or more) the normal distance to form a solvent bond between coupling and pipe. For this reason, the outer surfaces of the sleeve bushings 22 and of the boss or bushing 26 may be slightly tapered. The taper can be less than that of the coupling. Alternatively, the bushings 22 and 26 could still form a step, with the bushing/boss 26 slightly larger, but the even taper of the two is preferred. If a stepped configuration is used, the configuration of FIG. 3 is preferred.

FIG. 4 also shows the example where the enlarged end 26 or boss is formed integrally with the molded pipe. This applies to the embodiment of FIGS. 3A and 3B as well.

It is also possible, provided the replacement pipe 24 is of sufficient length, to include the two one-way couplings 20 loosely held on the replacement pipe toward the center, rather than those couplings being slipped over the existing pipe ends. The replacement pipe would then have increased-diameter bosses at its ends but of the smaller diameter like the bushing 22 in this case. The couplings would be oriented in the opposite direction, with their larger-diameter openings facing outwardly rather than toward one another. The positions of the bosses 26 and bushings 22 would then be reversed, with the bushings on existing pipe ends being of the larger diameter and the bushings or bosses on the replacement pipe being of the smaller diameter. To complete the joints, after applying the solvent adhesive, the couplings would be pushed outwardly, away from each other, to envelop and engage the bosses and bushings.

FIG. 5 is a view similar to FIG. 3 but showing the installation of a valve 38 in the existing line, rather than a repair pipe. As shown the valve can be provided with enlarged-diameter ends or bosses 26a providing a section of minimum axial length, useful for tight spaces. The exterior bosses 26a are of the diameter of the bosses 26 shown in FIG. 3, and they could actually be an essentially continuous pipe at that diameter including the valve, and the assembly is the same. Other fittings can be inserted into an existing line in this way, such as a branch, i.e. Tee fitting or a Y fitting.

The invention encompasses a single plastic pipe joint formed in the manner described, with enlarged-diameter ends formed on the adjacent similar pipe sections and a special tapered coupling slid over and solvent bonded to both pipe ends to make the joint. FIGS. 6 and 7 demonstrate the invention used at a single joint. In most situations, a length of existing pipe can be deflected, i.e. slightly curved through a length of several feet, to the extent that the pipe ends are offset and fittings such as in the invention can be slid onto the two pipe sections 10 and 40. This is true particularly with pipe which is smaller in diameter and more bendable, and is demonstrated in FIG. 6. Also in FIG. 6, a section of the existing pipe 10 has been removed and a replacement piece 40 has been solvent bonded in the normal way to the existing pipe at the right side of the drawing via a typical coupling 16. FIG. 7 shows that components of the invention, mainly a sleeve bushing 22, and the special coupling 20 of the invention have been slid/slipped over the new section of pipe 40, and a large bushing 26 can be slid onto the existing pipe end 10, while the section 40 is in a slightly unaligned position as shown in FIG. 6. Bushings 26 and 22 are solvent welded to the existing pipe 10 at the left and to the immediately adjacent end of the new section of pipe 40, respectively. At this point the special coupling 20 is positioned loosely on the pipe section 46. Then the special coupling 20, with solvent adhesive applied to its inner surfaces or to the outer surfaces of the bushings 22 and 26, or both, is slid to the left in FIG. 7, forced over the two bushings to form tight and secure solvent welds, securing the joint 44. Of course the position of the components 20, 22 and 26 could be reversed left/right if desired. Also, a joint can be formed in this way in the absence of any normal coupling 16, although such a situation would not be common.

Figure 8:
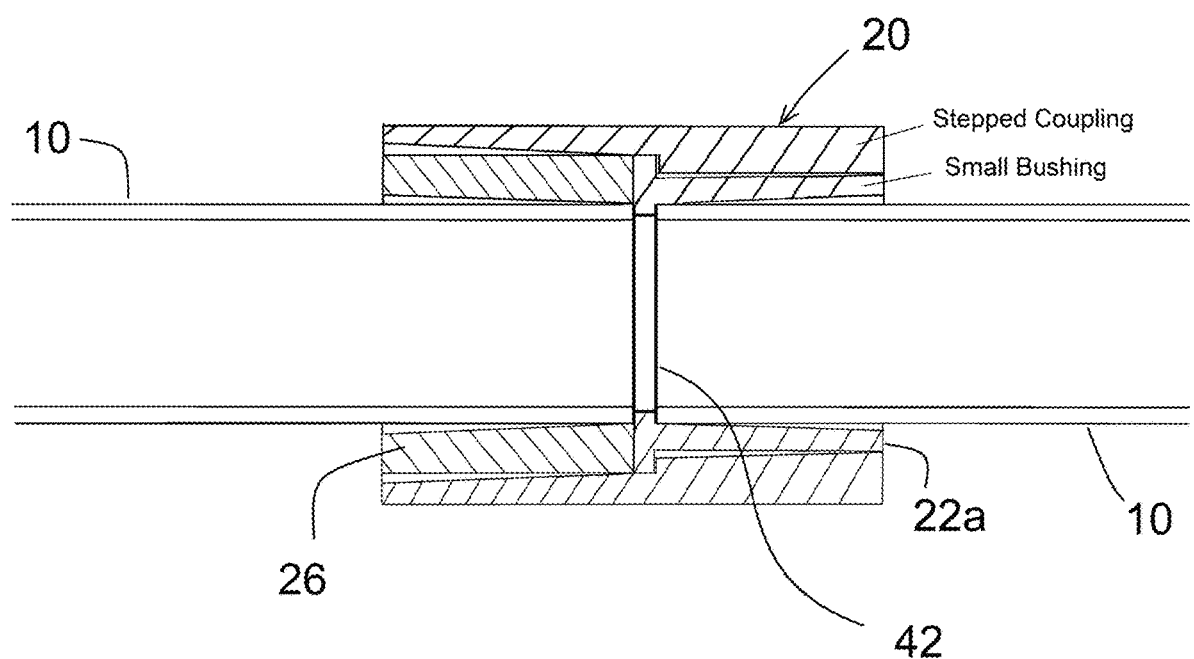
FIG. 8 is a detail view in section, showing an embodiment of the invention.

FIG. 8 is another cross section showing a detail of a pipe joint formed in accordance with the invention. The pipes being joined are shown at 10 and 10a. In this detail the one pipe section 10a has a small bushing 22a, generally similar to the small bushing 22 shown in FIGS. 3A, 3B and 4. The alternative, as noted above, is an integrally formed large end at 22.

FIG. 8 shows a preferred embodiment wherein a stop 42 is included on the small bushing 22a. This is preferred in that the bushing 22a, when slipped onto the pipe section 10a, gives a tactile limit to the insertion of the pipe, i.e. it is readily determined that the pipe end has reached the bottom of the tapered interior of the small bushing 22a. Such a stop is typical with the use of standard PVC couplings such as shown at 16 above. Here, the stop 42 also provides a stop when the stepped special coupling 20 is slipped over both the smaller bushing 22 and the larger bushing 26. FIG. 8 also shows (exaggerated) the internal taper of the large bushing 26 and of the small bushing 22a. These two bushings, which are sometimes called in the trade "spigot by socket" or "slip by slip" bushings, have the internal taper and a preferably cylindrical nontapered external surface, although that surface could be tapered somewhat if desired, as noted above.

In the case of the small bushing 22a with the stop 42, the two pipe sections 10 and 10a must have a gap between them sufficient to accommodate the thickness of the stop. Note that the stop 42 could be on the larger bushing if desired, or such stops could be on both bushings 26 and 22a.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A replacement pipe fitting assembly for rigid plastic cylindrical pipe, used in an existing length of pipe wherein use of standard slip-on solvent weld couplings to replace a section of pipe is not possible, comprising:

a replacement pipe of at least the same diameter as the existing length of pipe, each end of the replacement pipe having a first enlarged outside diameter greater than that of the existing pipe with the enlarged outside diameter being of a length of at least a prescribed socket length for solvent weld couplings of the plastic pipe, said replacement pipe being placed coaxially with the existing length of pipe where a section of existing pipe has been removed, two sleeve bushings attached by solvent bonding to ends of the existing length of pipe, each sleeve bushing being a generally hollow cylinder having an inside surface permanently secured by solvent adhesive to an end of the existing length of pipe, and having an outside generally cylindrical surface of a second enlarged outside diameter smaller than the first enlarged outside diameter on the replacement pipe, two generally cylindrical special couplings, one fitted loosely over each end of the existing length of pipe, each special coupling having a varying inside diameter such that with the replacement pipe positioned closely between the two ends of the existing length of pipe in a position formerly occupied by the section of pipe being replaced, each special coupling can be slid toward the replacement pipe and, with solvent adhesive applied to the outer surfaces of the replacement pipe ends and of the sleeve bushings or to the inner surface of the special coupling, or both, the special coupling can engage closely with the outer surfaces of the sleeve bushings on the existing pipe and of the ends of the replacement pipe, to permanently secure the adjacent ends of the existing length of pipe and of the replacement pipe together.

2. The replacement pipe fitting of claim 1, wherein each of the two special couplings has a stepped interior with a larger diameter in a side facing the replacement pipe and a smaller diameter in a side facing the existing length of pipe, each side having an industry-standard socket taper from larger to smaller diameter from replacement pipe side to existing length of pipe side.

3. The replacement pipe fitting of claim 1, wherein each special coupling has an interior with continuously tapered diameter from a larger end facing the replacement pipe to a smaller end opposite the replacement pipe.

4. The replacement pipe fitting of claim 3, wherein the sleeve bushings and the replacement pipe ends are cylindrical outer surfaces, substantially without taper.

5. The replacement pipe fitting of claim 3, wherein the sleeve bushings and the replacement pipe ends are tapered on outer surfaces for engagement with the continuously tapered interior of the special coupling.

6. The replacement pipe fitting of claim 1, wherein the axial length of the replacement pipe is essentially only a length needed to fill a required socket depth with solvent welds with the two couplings.

7. The replacement pipe fitting of claim 1, wherein the ends of the replacement pipe of said first enlarged outside diameter are integrally molded in the replacement pipe.

8. The replacement pipe fitting of claim 1, wherein the ends of the replacement pipe of said first enlarged outside diameter comprise large bushings secured to the replacement pipe by solvent welding.

9. The replacement pipe fitting of claim 1, wherein the sleeve bushings and the replacement pipe ends are cylindrical, substantially without taper.

10. The replacement pipe fitting of claim 1, wherein the replacement pipe includes a valve or branch fitting.

11. The replacement pipe fitting of claim 10, wherein the axial length of the replacement pipe includes the valve or Tee and essentially only additional length needed to fill a required socket depth with solvent welds with the two couplings.

12. A pipe joint assembly connecting first and second adjacent aligned pipe sections, both of a specified minimum diameter in a line of rigid plastic cylindrical pipe of a type suitable for use with standard slip-on solvent weld couplings, comprising:
a first pipe end of the first section having a first enlarged diameter greater than that of the line of pipe, through an axial length of at least a prescribed socket length for solvent weld couplings of the plastic pipe,
a sleeve bushing attached by solvent bonding to a second pipe end on the second pipe section of the line of pipe, the sleeve bushing being a generally hollow cylinder having an inside surface adapted to be permanently secured by solvent adhesive to the second pipe end, and having an outside generally cylindrical surface of a second enlarged diameter smaller than the first enlarged diameter on the first pipe end, and
a generally cylindrical special coupling fitted over the second pipe end, the special coupling having a varying inside diameter engaging firmly over both the first and second pipe ends with solvent adhesive between the inside of the special coupling and the outside surfaces of the second and first pipe ends with their second and first enlarged diameters, permanently securing the two sections of pipe together at the pipe joint assembly.

13. The pipe joint assembly of claim 12, wherein the special coupling has a stepped interior with a larger diameter in a side engaging the first enlarged diameter and a smaller diameter in a side engaging the second enlarged diameter, each side being tapered from larger to smaller diameter from the first pipe section toward the second pipe section.

14. The pipe joint assembly of claim 12, wherein the coupling has an interior with continuously tapered diameter from a larger-diameter end facing the first pipe section to a smaller-diameter end facing the second pipe section.

15. The pipe joint assembly of claim 14, wherein the sleeve bushings and the first pipe end are cylindrical, substantially without taper.

16. The pipe joint assembly of claim 14, wherein outer surfaces of the sleeve bushing and the first pipe end are tapered for engagement with the continuously tapered interior of the coupling.

17. The pipe joint assembly of claim 12, wherein the first enlarged diameter on the first pipe end is integrally molded with the first pipe section.

18. The pipe joint assembly of claim 12, wherein the first enlarged diameter on the first pipe end comprises a bushing secured to the first pipe section by solvent welding.

19. A method for connecting two adjacent pipe sections in a line of plastic pipe of a consistent diameter, the pipe being of a type connectable by solvent welding at couplings and fittings, comprising:
providing a first enlarged-diameter end, larger in diameter than said consistent diameter, on a first pipe section of the two pipe sections,
providing a special one-way coupling with two different serially arranged interior diameters, loosely positioned on a second pipe section of the two pipe sections,
securing a bushing sleeve on the second pipe section by solvent welding, the bushing sleeve being smaller in outside diameter than the first enlarged-diameter end, so as to provide a second enlarged diameter end on the second pipe section,
applying solvent adhesive onto exterior surfaces of the first and second pipe ends or interior surfaces of the one-way coupling, or both, and
sliding the special one-way coupling, with larger interior diameter forward, over the enlarged-diameter ends of both the second and first pipe sections to solvent weld the two pipe ends together.

20. The method of claim 19, wherein the first enlarged-diameter end on the first pipe section is provided by solvent welding a bushing onto the first pipe section.

21. The method of claim 19, wherein one of the first and second pipe sections is a replacement pipe section fitted into the line of plastic pipe where a section of pipe has been removed.

* * * * *